US012404639B2

(12) United States Patent
Bertz et al.

(10) Patent No.: US 12,404,639 B2
(45) Date of Patent: Sep. 2, 2025

(54) TAMPER STROKE ADJUSTMENT

(71) Applicant: JOSEPH VOEGELE AG, Ludwigshafen/Rhein (DE)

(72) Inventors: Klaus Bertz, Dittelsheim-Hessloch (DE); Ralf Weiser, Ladenburg (DE); Tobias Noll, Roschbach (DE); Christian Pawlik, Neustadt (DE)

(73) Assignee: Joseph Voegele AG, Ludwigshafen/Rhein (DE)

( * ) Notice: Subject to any disclaimer, the term of this patent is extended or adjusted under 35 U.S.C. 154(b) by 904 days.

(21) Appl. No.: 17/575,745

(22) Filed: Jan. 14, 2022

(65) Prior Publication Data

US 2022/0220674 A1 Jul. 14, 2022

(30) Foreign Application Priority Data

Jan. 14, 2021 (EP) .................................... 21151612

(51) Int. Cl.
*E01C 19/40* (2006.01)
*B06B 1/16* (2006.01)

(52) U.S. Cl.
CPC .............. *E01C 19/40* (2013.01); *B06B 1/162* (2013.01)

(58) Field of Classification Search
CPC ........................... E01C 19/486; E01C 2301/20
See application file for complete search history.

(56) References Cited

U.S. PATENT DOCUMENTS

| | | |
|---|---|---|
| 4,427,358 A | 1/1984 | Stilwell |
| 4,507,014 A | 3/1985 | Heims et al. |
| 4,828,428 A | 5/1989 | Anderson |
| 5,423,628 A | 6/1995 | Jaworski |
| 5,544,576 A | 8/1996 | Kato |
| 7,540,686 B2 | 6/2009 | Heims |

(Continued)

FOREIGN PATENT DOCUMENTS

| | | |
|---|---|---|
| CN | 101821456 A | 9/2010 |
| CN | 102107180 A | 6/2011 |

(Continued)

OTHER PUBLICATIONS

European Search Report Dated Jun. 14, 2021, Application No. 21151612.5-1002, Applicant Joseph Voegele AG, 8 Pages.

(Continued)

*Primary Examiner* — Abigail A Risic
(74) *Attorney, Agent, or Firm* — Brooks Kushman P.C.

(57) ABSTRACT

The disclosure relates to a road finishing machine with a screed for producing a paving layer, wherein the screed includes at least one compacting unit for precompacting paving material supplied to the screed. The compacting unit includes at least one eccentric bushing mounted on an eccentric shaft supporting the same and rotatable to a desired angle of rotation to thereby continuously variably set a desired tamper stroke of a tamper bar of the compacting unit. For rotating the eccentric bushing, the compacting unit includes at least one adjusting mechanism, wherein the adjusting mechanism includes an adjusting drive mounted on the eccentric shaft and rotatable along with the eccentric shaft. The disclosure furthermore relates to a method for a continuously variable tamper stroke adjustment at a compacting unit of a road finishing machine.

21 Claims, 2 Drawing Sheets

(56) References Cited

U.S. PATENT DOCUMENTS

| | | | |
|---|---|---|---|
| 8,371,770 | B1 | 2/2013 | Rasmusson et al. |
| 8,534,955 | B2 | 9/2013 | Buschmann et al. |
| 8,807,866 | B2 | 8/2014 | Buschmann et al. |
| 9,039,324 | B2 | 5/2015 | Ackermann et al. |
| 9,487,924 | B2 | 11/2016 | Bertz et al. |
| 9,790,648 | B2 | 10/2017 | Buschmann et al. |
| 10,060,086 | B2 | 8/2018 | Laugwitz |
| 10,246,834 | B1 | 4/2019 | Ellwein et al. |
| 10,265,730 | B2 | 4/2019 | Johnsson et al. |
| 10,472,777 | B1 | 11/2019 | Case |
| 10,808,362 | B2 | 10/2020 | Seyriehner |
| 11,401,859 | B2 | 8/2022 | Gutzer |
| 2002/0168226 | A1 | 11/2002 | Feucht et al. |
| 2010/0284743 | A1 | 11/2010 | Stefan |
| 2011/0123270 | A1 | 5/2011 | Buschmann et al. |
| 2011/0229263 | A1 | 9/2011 | Buschmann et al. |
| 2017/0183831 | A1 | 6/2017 | Laugwitz |
| 2022/0220674 | A1 | 7/2022 | Bertz et al. |
| 2022/0220675 | A1 | 7/2022 | Bertz et al. |

FOREIGN PATENT DOCUMENTS

| | | | | |
|---|---|---|---|---|
| CN | 102191743 | A | 9/2011 | |
| CN | 101906750 | B | 1/2012 | |
| CN | 102535314 | A | 7/2012 | |
| CN | 102985616 | A | 3/2013 | |
| CN | 104831604 | A | 8/2015 | |
| CN | 110158422 | A | 8/2019 | |
| CN | 110438869 | A | 11/2019 | |
| CN | 216973050 | U | 7/2022 | |
| CN | 217266804 | U | 8/2022 | |
| DE | 3222128 | C2 | 4/1989 | |
| DE | 4307535 | A1 | 9/1994 | |
| DE | 4437958 | A1 | 4/1995 | |
| DE | 19836269 | C1 * | 8/1999 | ........... E01C 19/407 |
| DE | 102013021494 | A1 | 7/2014 | |
| DE | 102015016777 | A1 | 6/2017 | |
| EP | 0115567 | A1 | 8/1984 | |
| EP | 0941832 | A1 | 9/1999 | |
| EP | 1 905 899 | A2 | 4/2008 | |
| EP | 2366832 | A1 | 9/2011 | |
| EP | 2 599 918 | A1 | 6/2013 | |
| EP | 2 599 919 | A1 | 6/2013 | |
| EP | 3 249 101 | A1 | 11/2017 | |
| EP | 3 138 961 | B1 | 8/2018 | |
| GB | 659423 | | 10/1951 | |
| JP | S48-10985 | Y | 3/1973 | |
| JP | H2-240306 | A | 9/1990 | |
| JP | H04330972 | A | 11/1992 | |
| JP | 2000001810 | A | 1/2000 | |
| JP | 2007136528 | A1 | 6/2007 | |
| JP | 2011-196175 | A | 10/2011 | |
| SE | 1500069 | A1 | 8/2016 | |
| WO | 8102593 | A1 | 9/1981 | |
| WO | 2015/179988 | A1 | 12/2015 | |
| WO | 2017084733 | A1 | 5/2017 | |
| WO | 2020099056 | A1 | 5/2020 | |
| WO | 2021151462 | A1 | 8/2021 | |

OTHER PUBLICATIONS

U.S. Non-Final Office Action dated Oct. 26, 2023, Co-Pending U.S. Appl. No. 17/575,687, 27 Pages.

Für jede Aufgabe die richtige Einbaubohle, by Joseph Vögele AG, 68146 Mannheim/DE, No. 2400/10/2.1997 (with English machine translation) (21 pages).

Opposition to a European Patent re Patent No. 4029992 (Application No. EP21151612.5), Applicant: Joseph Voegele AG, Notice dated Jan. 15, 2024 (with English machine translation) (56 pages).

Chinese Office Action and Search Report re Chinese Application No. 2022100563167 dated Mar. 15, 2024, Applicant: Joseph Voegele Corporation (with English machine translation) (13 pages).

Opposition to a European Patent re Patent No. 4029991 (Application No. EP21151610.9), Applicant: Joseph Voegele AG, Notice dated Mar. 18, 2024 (with English machine translation) (115 pages).

Chinese Office Action and Search Report re Chinese Application No. 202210056305.9 dated Mar. 20, 2024, Applicant: Joseph Voegele Corporation (with English machine translation) (17 pages).

Response to Non-Final Office Action of Oct. 26, 2023, filed in co-pending U.S. Appl. No. 17/575,687 on Jan. 24, 2024 (10 pages).

Notice of Allowance and Fee(s) Due mailed Feb. 7, 2024, in co-pending U.S. Appl. No. 17/575,687 (5 pages).

Corrected Notice of Allowability mailed Apr. 10, 2024, in co-pending U.S. Appl. No. 17/575,687 (2 pages).

Japanese Office Action (with English Machine Translation) Dated Jan. 17, 2023, Application No. 2022-000936, 6 Pages.

European Search Report (with English Machine Translation) Dated Jun. 16, 2021, Application No. 21151610.9-1002, Applicant Joseph Voegele AG, 10 Pages.

Chinese Notification to Grant Patent Right for Invention, CN Application No. 2022100563059, Applicant: Joseph Voegle AG, dated Jun. 12, 2024 (with English machine translation) (2 pages).

Chinese Search Report, CN Application No. 2022100563059, Applicant: Joseph Voegle AG, dated Jun. 6, 2024 (with English machine translation) (5 pages).

* cited by examiner

TAMPER STROKE ADJUSTMENT

CROSS-REFERENCE TO RELATED APPLICATIONS

This application claims foreign priority benefits under 35 U.S.C. § 119(a)-(d) to European patent application number EP 21151612.5, filed Jan. 14, 2021, which is incorporated by reference in its entirety.

TECHNICAL FIELD

The present disclosure relates to a road finishing machine and to a method for a continuous tamper stroke adjustment at a road finishing machine.

BACKGROUND

EP 3 138 961 B1 discloses a road finishing machine whose screed includes a tamper stroke adjusting means. The tamper stroke adjusting means has an adjusting transmission provided between a rotationally driveable eccentric shaft and an eccentric bushing rotatably mounted on the eccentric shaft. The stroke of the tamper bar is set by rotating the eccentric bushing on the eccentric shaft. EP 3 138 961 B1 moreover discloses an adjusting transmission which is provided between the rotationally driveable eccentric shaft and an eccentric bushing mounted on the eccentric shaft in a torque-proof manner, wherein for adjusting the tamper stroke of the tamper bar, the eccentric bushing is shifted over the adjusting transmission transversely to the eccentric shaft. EP 3 138 961 B1 finally discloses an adjusting transmission which includes a toggle mechanism.

In the two first-mentioned solutions above, the eccentric stroke adjustment during the operation of the road finishing machine is a technical challenge. This is in particular due to the fact that an activation or actuation of the adjusting transmission directly mounted on the eccentric shaft between the eccentric bushing and the eccentric shaft is difficult to carry out. The toggle mechanism is constructively rather complex and occupies a lot of space at the screed.

U.S. Pat. No. 8,371,770 B1 discloses a screed with a tamper stroke adjusting means including a threaded rod and a threaded bushing movably mounted thereon. An axial adjustment of the threaded bushing along the threaded rod moves a lever arm mounted at the threaded bushing on the position and orientation of which the tamper stroke setting at the screed of the road finishing machine depends.

EP 1 905 899 A2 discloses a screed for a road finishing machine on which a tamper stroke adjusting means is mounted. The tamper stroke adjusting means comprises a bearing support for an eccentric shaft horizontally and movably mounted along a guiding slide on which an eccentric bushing is mounted in a torque-proof manner. By a horizontal displacement of the bearing support, a distance between the eccentric shaft mounted thereon and a tilting axle provided on the screed can be adjusted manually whereby a tamper stroke adjustment is effected.

EP 2 599 918 A1 discloses a method and a device for setting an upper dead center of a stamper bar of a road finishing machine. EP 2 599 919 A1 discloses a further device for a stroke adjustment of a stamper bar of a road finishing machine.

SUMMARY

It is an object of the disclosure to provide a road finishing machine with a tamper stroke adjusting means and a method for a continuous tamper stroke adjustment at a road finishing machine, whereby the tamper stroke can be set, by means of simple, constructive technical means, in particular using fewer modules in a compact design, precisely and continuously variably, mainly during the paving operation of the road finishing machine.

The disclosure relates to a road finishing machine with a screed for producing a paving layer, wherein the screed includes at least one compacting unit for precompacting paving material supplied to the screed, and wherein the compacting unit comprises at least one eccentric bushing mounted on an eccentric shaft supporting the same to be rotatable at a desired angle of rotation to thereby continuously variably set a desired tamper stroke of a tamper bar of the compacting unit. The compacting unit includes, for rotating the eccentric bushing, i.e., for adjusting the tamper stroke, at least one adjusting mechanism.

According to the disclosure, the adjusting mechanism includes an adjusting drive mounted on the eccentric shaft and rotating along with the eccentric shaft. By the adjusting drive being positioned directly on the eccentric shaft in the disclosure, that means by the eccentric shaft being employed as a support for the adjusting drive, a compact design altogether results for the compacting unit which permits a tamper stroke adjustment at the screed of the road finishing machine using fewer modules and less application of force.

In the disclosure, the eccentric bushing and the adjusting drive provided for the same are positioned together on the eccentric shaft. Both thus rotate with the speed of the eccentric shaft during the operation. The adjusting drive can rotate the eccentric bushing relative to the eccentric shaft, i.e., vary the angle of rotation between these components, whereby the tamper stroke can be correspondingly set at the compacting unit.

The rotation of the eccentric bushing on the rotationally driven eccentric shaft, i.e., the respective eccentricities of these two components with respect to each other, is accomplished in response to a phase adjustment which is performed by the adjusting drive rotating itself along on the eccentric shaft, whereby the desired tamper stroke can be set at the screed. The phase adjustment can be advantageously activated, in particular with a low speed and low expenditure of force, by means of the adjusting drive mounted on the eccentric shaft in a torque-proof manner and rotating along itself at the speed of the eccentric shaft.

In order to set the angle of rotation between the eccentric bushing and the eccentric shaft, the adjusting drive rotating along can be at least temporarily phase-adjusted such that—seen from outside—it gears up or down the speed of the eccentric shaft supporting it such that a relative rotation of the eccentric bushing coupled to it thereby occurs on the eccentric shaft. In other words, the eccentric bushing coupled to the adjusting drive and rotating along on the eccentric shaft can be “slowed down” or “accelerated” corresponding to the phase adjustment activated by means of the adjusting drive relative to the rotary motion of the eccentric shaft, whereby the eccentric bushing rotates to a new angular position relative to the eccentric shaft. By the rotation of the eccentric bushing on the eccentric shaft, the tamper stroke can be adjusted. Without a separate activation of the adjusting drive rotating along on the eccentric shaft, the eccentric bushing rotates at the same speed as the eccentric bushing, i.e., together with it with a constant tamper stroke.

The term “rotating along” means that the adjusting drive rotates on the eccentric shaft and together with it due to its direct position on the latter. Thereby, the adjusting drive can be sensitively phase-adjusted for rotating the eccentric bushing, in particular already by short adjusting paths and with low expenditure of force, i.e., constructively simply relative to the rotation motion of the eccentric shaft, that means a change of the angular position of the eccentric bushing positioned on the eccentric shaft can be activated so that the tamper stroke of the tamper bar of the compacting unit can be changed.

Preferably, the adjusting mechanism includes an adjusting transmission mounted on the eccentric shaft that can be driven by means of the adjusting drive. The adjusting transmission can be connected to the eccentric bushing directly or via a clutch. The adjusting transmission can be a separately embodied module connected to the adjusting drive or be embodied to be integrated at the adjusting drive.

It is advantageous for the adjusting drive and the adjusting transmission to embody a function unit mounted on the eccentric shaft and rotating along with the rotary motion of the eccentric shaft. The thus created function unit rotating along has a compact design and can be perfectly employed for a tamper stroke adjustment on the eccentric shaft. The function unit provided thereby can be arranged as such along the eccentric shaft directly next to the eccentric bushing or at least at a very short distance to it which improves a compact design. In particular, such a function unit can be easily repaired without having to remove the eccentric bushing from the eccentric shaft in the process.

In an advantageous embodiment, the adjusting mechanism, in particular the function unit described in the previous section, is arranged within a housing surrounding the eccentric shaft. Thereby, the adjusting mechanism is present on the eccentric shaft both as a compactly built and well protected module and is thus predestined for being employed in a tight installation space directly at the site of the tamper stroke adjustment. Above all, the housing protects the adjusting mechanism mounted on the eccentric shaft against bituminous steams that rise in front of the screed, that means from a space of the lateral distributor.

For a low-noise and low-wear operation, it is advantageous for the housing to be embodied in the form of a hollow cylinder or a ring. Preferably, the hollow-cylindrical or annular housing is mounted on the eccentric shaft concentrically with respect to the axis of rotation of the same and in a torque-proof manner. The housing can have a two-piece design so that it can be easily removed from the eccentric shaft for a better accessibility of the adjusting mechanism received therein.

According to a variant, the adjusting drive can be arranged on the eccentric shaft centrically or eccentrically. Preferably, the adjusting mechanism is connected to the eccentric bushing directly, or by means of a positive clutch.

In the disclosure, the desired tamper stroke adjustment is preferably accomplished as a sum of the individual eccentricities formed on the eccentric shaft and the eccentric bushing mounted thereon. For this, the eccentric bushing can be rotatably arranged on an eccentric region of the eccentric shaft. Preferably, the adjusting drive is also seated on the eccentric region of the eccentric shaft, i.e., it is eccentrically arranged on the latter so that it can be directly coupled to the eccentric bushing. This results in a very compact installation space.

According to a variant, the adjusting drive is mounted on a centric region of the eccentric shaft, i.e., not on its eccentric region. In such a centric arrangement, the adjusting drive can be connected by means of a positive clutch, for example by means of a claw clutch, to the eccentric bushing mounted offset to it on the eccentric region of the eccentric shaft. Thereby, during the rotation of the eccentric shaft, an unbalance on the adjusting drive and the rotary bearing of the eccentric shaft can be better avoided.

Preferably, the adjusting drive can be actuated hydraulically, electrically, and/or mechanically. As such a drive unit, it can be perfectly positioned, in a compact design, directly on the eccentric shaft and at a short distance to the eccentric bushing.

It is possible for the adjusting drive to have an essentially annular design. Thereby, it can be arranged concentrically with respect to the axis of rotation of the eccentric shaft. In other words, it can thereby be pushed onto the eccentric shaft, embodied to surround it, and assume a torque-proof position on it. Such an adjusting drive can be perfectly arranged within the surrounding housing, above all when it has an essentially matching shape.

Preferably, the adjusting drive rotating along is embodied as an electromechanical phase adjuster, for example, as a servomotor. Thereby, it is activatable very precisely and by quick response and can as such be negligibly influenced by other process quantities, for example by unit temperatures. It would be conceivable that the adjusting drive is a phase adjuster driven by means of a slip ring unit arranged on the eccentric shaft and/or by means of an induction unit associated with the eccentric shaft at the output of which a phase adjustment can be set.

An adjusting drive present as a servomotor on the eccentric shaft can in particular be equipped with a sensor for determining the position of the motor shaft. The rotary position of the motor shaft determined by the sensor, i.e., the phase adjustment, is preferably continuously transmitted to a control electronics which controls the movement of the servomotor corresponding to one or more adjustable desired tamper strokes in a control loop.

The adjusting drive can be arranged on the eccentric shaft, according to one variant, as a hydraulically activatable phase adjuster to which a pressure can be applied by means of a hydraulic fluid, for example via the eccentric shaft, in particular via a hydraulic conduit embodied therein, to perform a desired phase adjustment and forward it to the eccentric bushing for setting the angle of rotation. By the eccentric shaft itself forming a hydraulic supply line for the adjusting drive, a particularly compact design would result. Here, it would be conceivable that the hydraulic adjusting drive is connected with a hydraulic system anyway provided at the screed.

Preferably, the compacting unit includes a plurality of unit sections that can be set independently, wherein one adjusting mechanism each is provided for the respective unit sections. These can be embodied to be independently activatable so that different tamper strokes can be set at the respective unit sections. It is conceivable that per unit section for each eccentric bushing rotationally mounted on the eccentric shaft, one adjusting mechanism is provided whose adjusting drive is positioned on the eccentric shaft to rotate along.

It is conceivable that the respective eccentric bushings simultaneously perform a desired rotation on the eccentric shaft, so that the same tamper stroke can be set at all unit sections. For example, for this, all adjusting mechanisms mounted on the eccentric shaft are simultaneously activatable for performing a phase adjustment. A mechanical coupling of a plurality of eccentric bushings would also be conceivable for this.

It is advantageous for the adjusting mechanism to include at least one accumulator for an energy supply of the adjusting drive. The accumulator can be mounted within the housing. It is moreover conceivable that the accumulator can be charged by means of a rotary motion of the eccentric shaft, for example by means of a sliding contact and/or on the basis of inductive charging. By this, the accumulator could be reliably available for the adjusting drive as a completely charged energy storage. For the adjusting system rotating along on the eccentric shaft, it is advantageous for the accumulator to essentially form an annular unit which is mounted on the eccentric shaft in a revolving manner and optionally arranged within the housing like the adjusting drive.

Preferably, the adjusting mechanism for the adjusting drive comprises at least one contact-induced power and/or signal transmission unit, for example a slip ring unit. This can be mounted directly on the eccentric shaft, in particular within the revolving housing. The slip ring unit is preferably embodied for bidirectional signal transmission which facilitates an automation of the adjusting mechanism.

In a preferred variant, the adjusting mechanism provides a contact-free power and/or signal transmission unit for the adjusting drive rotating along on the eccentric shaft. For example, a power and/or a signal transmission based on induction would be conceivable. An inductive power and/or signal transmission unit could be provided directly at the eccentric shaft. A bidirectional signal transmission function would here, too, be advantageous for an automated operation.

Independent of whether it is a contact-induced or a contact-free energy transmission, the adjusting drive seated on the eccentric shaft can be connected to a generator of the road finishing machine as a consumer. As an intermediate storage, the adjusting mechanism could provide at least one accumulator, preferably within the housing, to buffer the adjusting energy for the adjusting drive, for example a servomotor, provided by the generator.

In an advantageous variant, the adjusting mechanism for adjusting the desired tamper stroke is connected to a controlling system. The controlling system can receive the desired tamper stroke to be set from another controlling device of the road finishing machine, or it can calculate it itself. The controlling system can be connected to the adjusting drive by means of the signal transmission unit. It would be conceivable that the other controlling device that derives the desired tamper stroke is operatively linked to the controlling system via the signal transmission unit which is positioned itself within the housing, i.e., rotating along with the eccentric shaft. This additionally promotes the integral modular construction of the adjusting mechanism.

Preferably, the adjusting mechanism includes at least one sensor unit for detecting the angle of rotation set between the eccentric bushing and the eccentric shaft. The sensor unit could be, for example, an angle detecting sensor directly fixed to the adjusting drive, for example to the servomotor, by means of which the phase adjustment performed by means of the adjusting drive can be measured.

From a detected angle of rotation, one could calculate an actual tamper stroke, in particular by means of the controlling system, which is available to the controlling system for a variance comparison. For a dynamic adaptation of the actual tamper stroke, the controlling system could be equipped with a control electronics by means of which a continuous tamper stroke adjustment can be performed.

In a particularly preferred variant, the controlling system includes, for a dynamic adaptation of the angle of rotation of the eccentric bushing, at least one control loop responding to at least one process parameter detectable during the operation of the road finishing machine. By means of the control loop, one can correspondingly respond, for example, to a measured material-specific value of the paving material to be installed, for example to a measured temperature of the paving material transported from the material bunker of the road finishing machine to the screed, and/or the produced paving layer, for example a measured temperature of the paving layer, with an adaptation of the angle of rotation between the eccentric bushing and the eccentric shaft to create an optimal paving result.

In one preferred embodiment of the disclosure, the control loop is able to control a dynamic adjustment of the angle of rotation between the eccentric bushing and the eccentric shaft in reaction to a disturbance variable, for example an ambient temperature, for continuously adapting the tamper stroke.

It is conceivable that during the adjustment of the tamper stroke setting, a set angle of attack of the screed, a paving travel speed of the road finishing machine, a set drive speed of the eccentric shaft, a temperature of compacting plates of the screed, and/or measured values of a separate construction vehicle, for example measured values with respect to the produced paving layer, which are detected by a compacting vehicle driving behind the road finishing machine, are considered.

The sensor unit of the adjusting mechanism could, according to one embodiment, include at least one distance sensor which is embodied to directly measure a set actual tamper stroke of the tamper bar.

In one practical variant, the adjusting mechanism is embodied to be manually adjustable. This can be helpful above all for a calibration of the tamper bar at the beginning of the pavement drive. In contrast, an automated operation of the adjusting mechanism can be perfectly employed during the pavement drive.

Furthermore, the disclosure relates to a method for a continuously variable tamper stroke adjustment at a compacting unit of a road finishing machine, wherein for adjusting the tamper stroke, at least one eccentric bushing is rotated on an eccentric shaft supporting it. According to the disclosure, an adjusting drive rotating along with the eccentric shaft and mounted on the eccentric shaft is activated for rotating the eccentric bushing.

By the adjusting drive itself being directly mounted on the eccentric shaft and connected thereto in a torque-proof manner, i.e., considered as such rotating at the speed thereof, for the change of the tamper stroke, a corresponding phase adjustment can be precisely performed with low expenditure of force. Since the adjusting drive is connected to the eccentric shaft in a torque-proof manner, for generating the phase adjustment, only a low speed and a correspondingly small torque of the adjusting drive are required. Furthermore, the method according to the disclosure offers the possibility of a compact design of the components employed for the tamper stroke adjustment at the screed of the road finishing machine.

BRIEF DESCRIPTION OF THE DRAWINGS

Below, advantageous embodiments of the disclosure will be illustrated more in detail with reference to the figures.

Figure 1:
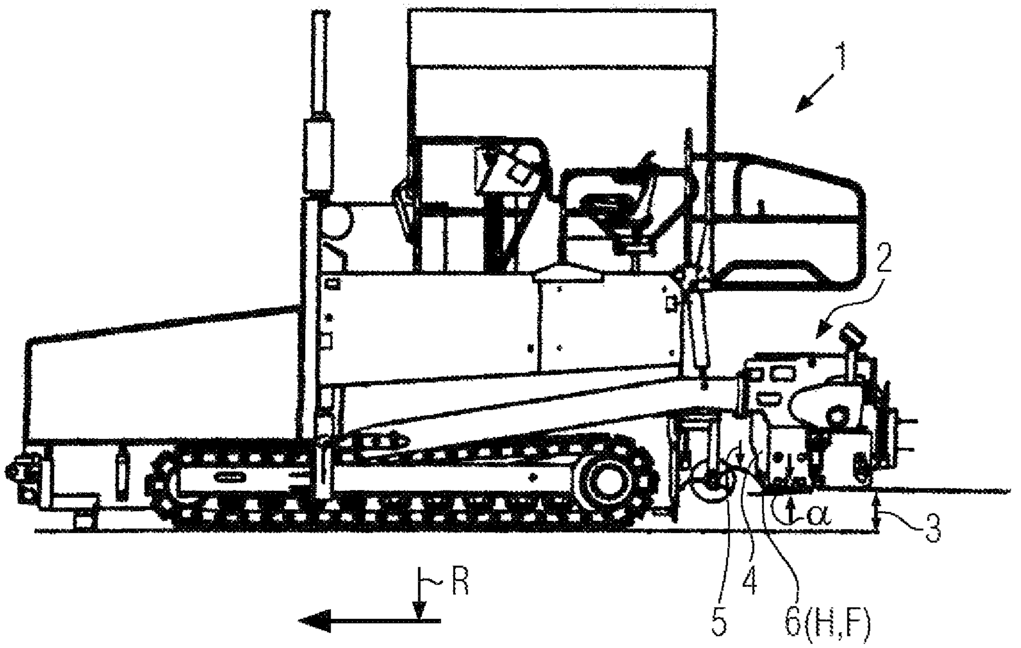
FIG. 1 shows a schematic side view of a road finishing machine.

Equal components are always provided with equal reference numerals in the figures.

DETAILED DESCRIPTION

FIG. 1 shows a road finishing machine 1 with a screed 2 for producing a paving layer 3 in the paving travel direction R. The screed 2 has at least one compacting unit 4 for precompacting a paving material 5 supplied to the screed 2. The compacting unit 4 includes a tamper bar 6 which can be driven with a variable tamper stroke H and/or a variable frequency F for precompacting the paving material 5 supplied to the screed 2.

Figure 2:
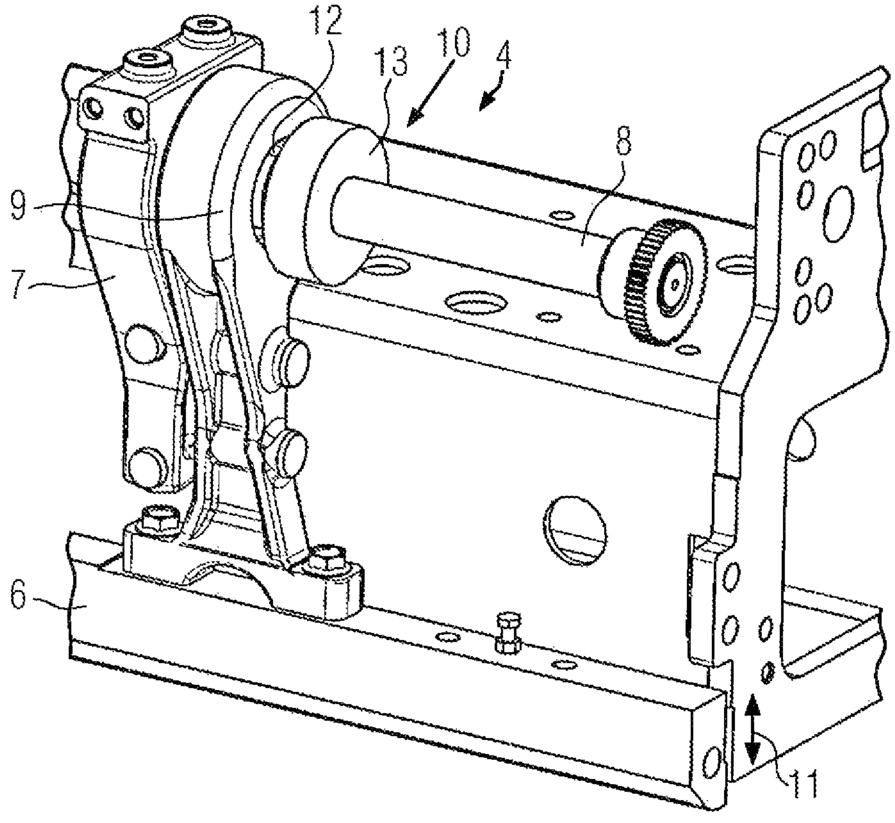
FIG. 2 shows a compacting unit for a screed of the road finishing machine.

FIG. 2 shows the compacting unit 4 in an enlarged perspective representation. The compacting unit 4 has a bearing support 7 fixed to the screed body and an eccentric shaft 8 rotationally mounted thereto. The eccentric shaft 8 drives a connecting rod 9 to which the tamper bar 6 is fixed.

FIG. 2 furthermore shows an adjusting mechanism 10 which is positioned on the eccentric shaft 8 in a torque-proof manner, i.e., rotates along with it. The adjusting mechanism 10 can be activated to set a variable desired tamper stroke 11 for the tamper bar 6. By means of an activation of the adjusting mechanism 10, an eccentric bushing 12 coupled thereto and rotationally mounted on the eccentric shaft 8, and which is positioned next to the adjusting mechanism 10 on the eccentric shaft 8, can be rotated.

FIG. 2 furthermore shows that the adjusting mechanism 10 provides a housing 13 surrounding the eccentric shaft 8. The housing 13 is embodied in the form of a hollow cylinder in FIG. 2 and is positioned concentrically with respect to the eccentric shaft 8. The housing 13 is mounted on the eccentric shaft 8 in a torque-proof manner and can in particular be made of a signal-transmitting material so that components received therein can better receive and emit electric signals. The housing 13 can be embodied for receiving all function units of the adjusting mechanism 10.

Figure 2A:
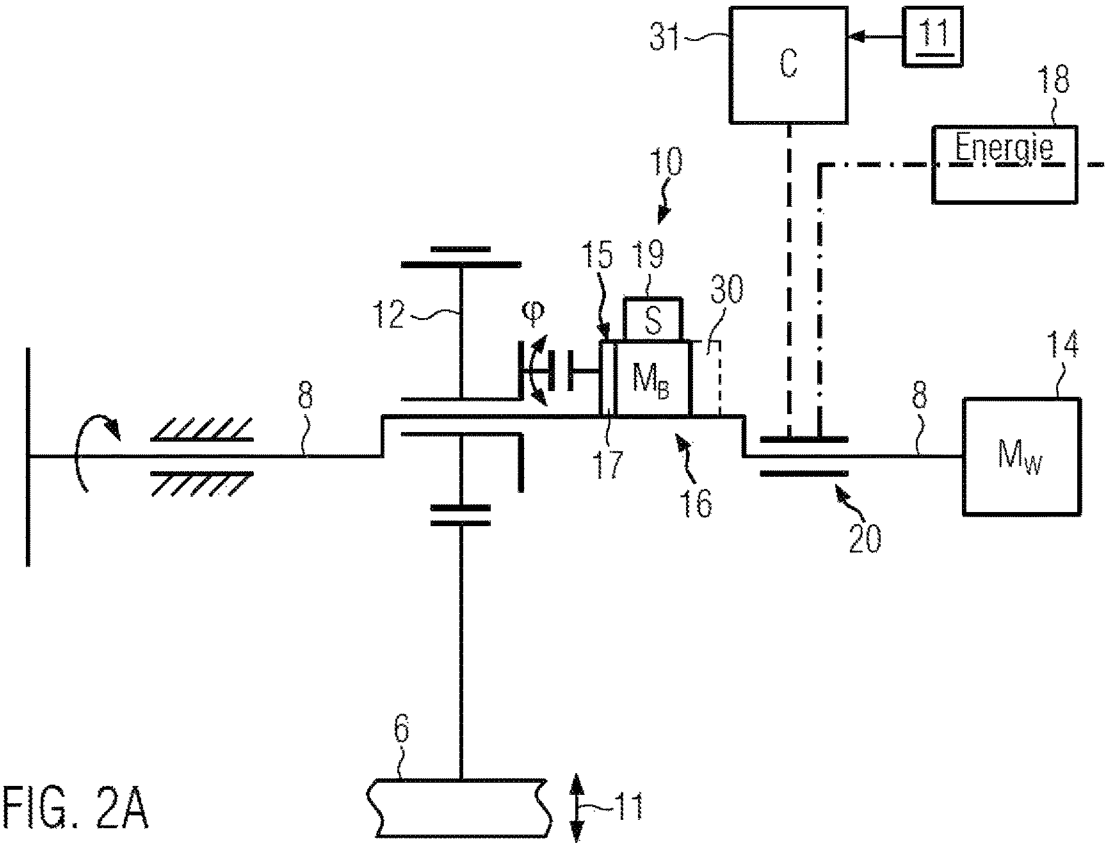
FIG. 2A shows a variant of the embodiment shown in FIG. 2.

FIG. 2A shows the compacting unit 4 of FIG. 2 according to a first variant in a schematic representation. For rotating the eccentric shaft 8, a drive 14, for example a hydraulic or electric motor, is provided. The adjusting mechanism 10 includes an adjusting drive 15 mounted on the eccentric shaft 8 and rotating along with a speed of the eccentric shaft 8. The adjusting drive 15 is positioned on an eccentric region 16 of the eccentric shaft 8.

Furthermore, FIG. 2A shows that the adjusting drive 15 is connected to an adjusting transmission 17. Via the adjusting transmission 17, the adjusting drive 15 is coupled to the eccentric bushing 12 which is also positioned on the eccentric region 16 of the eccentric shaft 8. By means of an activation of the adjusting drive 15, an angle of rotation φ of the eccentric bushing 12 positioned on the eccentric region 16 can be changed to set the desired tamper stroke 11 for the tamper bar 6.

In FIG. 2A, a controlling system 31 and a power source 18 are furthermore functionally connected to the eccentric shaft 8. As an alternative or in addition to the power source 18, an energy supply of the adjusting drive 15 could also be accomplished by means of an accumulator 30. The latter can be provided as a primary energy source or as an energy buffer between the power source 18 and the adjusting drive 15.

To detect the set angle of rotation φ between the eccentric bushing 12 and the eccentric shaft 8, the adjusting drive 15 includes a sensor unit 19. The controlling system 31 can be designed for signal transmission. Thus, the controlling system 31 is embodied for a signal transmission to the adjusting drive 15, and further for a signal reception of signals emitted by the adjusting drive 15, for example for receiving measuring signals of the sensor unit 19.

The power transmission and/or signal transmission can be performed by means of a power and/or signal transmission unit 20. It can be present as a sliding contact unit or alternatively be embodied in the form of an induction unit.

FIG. 2A furthermore shows that the desired tamper stroke 11 can be provided to the controlling system 31, so that an activation of the adjusting drive 15 can be correspondingly performed by means of the controlling system 31 via the signal transmission unit 20. On the basis of such an activation, a phase adjustment can be performed by means of the adjusting drive 15 which can be transmitted to the eccentric bushing 12 via the adjusting transmission 17, so that the desired angle of rotation φ to the eccentric bushing 8 results at it.

In FIG. 2A, the adjusting mechanism 10 is directly connected to the eccentric bushing 12, since both the adjusting drive 15 and the eccentric bushing 12 are positioned on the eccentric region 16 of the eccentric shaft 8.

Figure 2B:
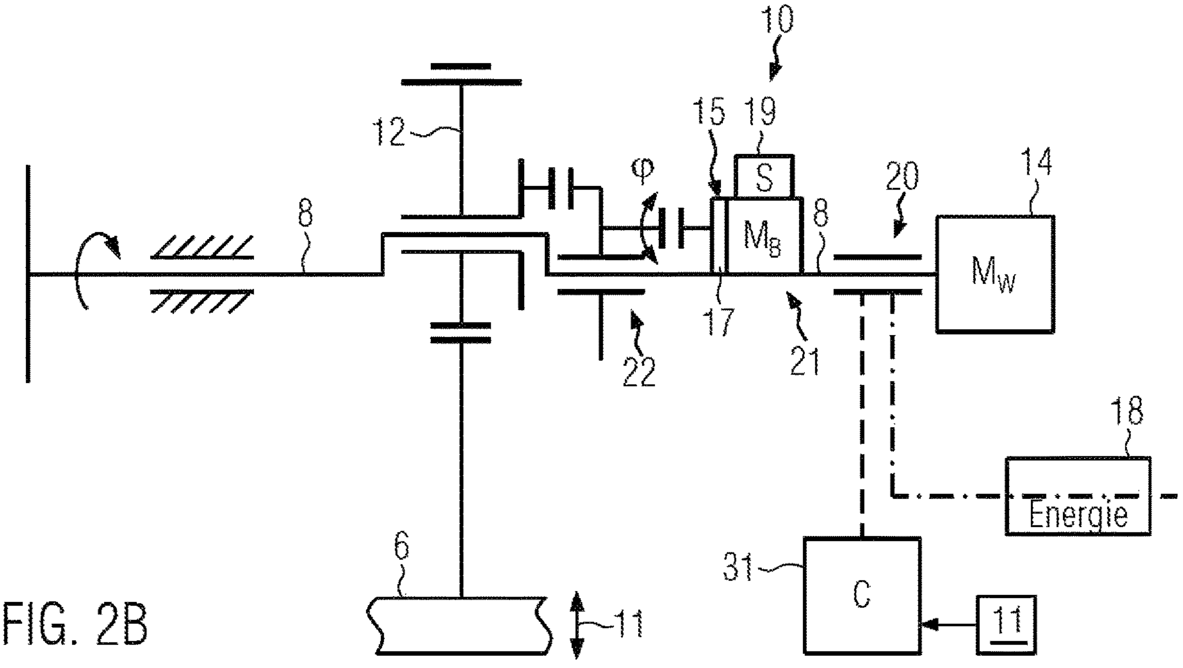
FIG. 2B shows a further variant of the embodiment shown in FIG. 2.

FIG. 2B shows an alternative variant of the adjusting mechanism 10. In this variant, the adjusting drive 15 is mounted on a centrical region 21 of the eccentric shaft 8. Furthermore, the adjusting mechanism 10 provides a positive clutch 22. An activation of the adjusting drive 15 causes, via the adjusting transmission 17, the positive clutch 22, for example a claw clutch, to transmit an adjusting moment to the eccentric bushing 12 such that it is phase-shifted on the eccentric shaft 8 to set the desired tamper stroke 11.

What is claimed is:

1. A road finishing machine comprising a screed for producing a paving layer, wherein the screed includes a compacting unit for precompacting paving material supplied to the screed, wherein the compacting unit includes an eccentric bushing mounted on an eccentric shaft supporting the same and rotatable at a desired angle of rotation to thereby continuously variably set a desired tamper stroke of a tamper bar of the compacting unit, and wherein for rotating the eccentric bushing, the compacting unit includes an adjusting mechanism, wherein the adjusting mechanism includes an adjusting drive rotatable along with the eccentric shaft and mounted on the eccentric shaft.

2. The road finishing machine according to claim 1, wherein the adjusting mechanism includes an adjusting transmission mounted on the eccentric shaft and activatable by means of the adjusting drive.

3. The road finishing machine according to claim 2, wherein the adjusting drive and the adjusting transmission embody a function unit mounted on the eccentric shaft and rotatable along with rotary motion of the eccentric shaft.

4. The road finishing machine according to claim 1, wherein the adjusting mechanism is arranged within a housing surrounding the eccentric shaft.

5. The road finishing machine according to claim 4, wherein the housing is embodied as a hollow cylinder or a ring.

6. The road finishing machine according to claim 1, wherein the adjusting drive is arranged on the eccentric shaft centrically or eccentrically.

7. The road finishing machine according to claim 1, wherein the adjusting mechanism is connected to the eccentric bushing directly or by means of a positive clutch.

8. The road finishing machine according to claim 1, wherein the adjusting drive can be actuated hydraulically, electrically and/or mechanically.

9. The road finishing machine according to claim 1, wherein the compacting unit includes a plurality of independently adjustable unit sections, wherein for the respective unit sections, one adjusting mechanism each is provided.

10. The road finishing machine according to claim 1, wherein the adjusting mechanism includes at least one accumulator for an energy supply of the adjusting drive.

11. The road finishing machine according to claim 1, wherein the adjusting mechanism provides a sliding contact-induced power and/or signal transmission for the adjusting drive.

12. The road finishing machine according to claim 1, wherein the adjusting mechanism provides a contact-free power and/or signal transmission for the adjusting drive.

13. The road finishing machine according to claim 1, wherein the adjusting mechanism is connected to a controlling system for setting the desired tamper stroke.

14. The road finishing machine according to claim 1, wherein the adjusting mechanism includes at least one sensor unit for detecting the angle of rotation set between the eccentric bushing and the eccentric shaft.

15. A method for a continuously variable tamper stroke adjustment at a compacting unit of a road finishing machine, the method comprising:

rotating an eccentric bushing on an eccentric shaft that supports the eccentric bushing to adjust tamper stroke, wherein for rotating the eccentric bushing, an adjusting drive mounted on the eccentric shaft and rotating along with the eccentric shaft is activated.

16. The method according to claim 15, wherein the adjusting drive is connected to an adjusting transmission mounted on the eccentric shaft and activatable by the adjusting drive.

17. The method according to claim 16, wherein the adjusting drive and the adjusting transmission embody a function unit mounted on the eccentric shaft and rotatable along with rotary motion of the eccentric shaft.

18. The method according to claim 15, wherein sliding contact-induced power and/or signal transmission is provided for the adjusting drive.

19. The method according to claim 15, wherein contact-free power and/or signal transmission is provided for the adjusting drive.

20. The method according to claim 15, wherein the adjusting drive is connected to a controlling system for setting a desired tamper stroke.

21. The method according to claim 15, wherein the adjusting drive includes at least one sensor unit for detecting the angle of rotation set between the eccentric bushing and the eccentric shaft.

* * * * *